US012277370B2

(12) United States Patent
Kumar et al.

(10) Patent No.: US 12,277,370 B2
(45) Date of Patent: Apr. 15, 2025

(54) SYSTEMS AND METHODS FOR MACHINE LEARNING BASED PRODUCT DESIGN AUTOMATION AND OPTIMIZATION

(71) Applicant: Accenture Global Solutions Limited, Dublin (IE)

(72) Inventors: Amit Kumar, Sugar Land, TX (US); Nishant Mehta, Delhi (IN); Piyush Manocha, New Delhi (IN); Anshul Gupta, Delhi (IN); Anshul Anand, Lucknow (IN); Naveen Sankaran, Chennai (IN)

(73) Assignee: Accenture Global Solutions Limited, Dublin (IE)

( * ) Notice: Subject to any disclaimer, the term of this patent is extended or adjusted under 35 U.S.C. 154(b) by 929 days.

(21) Appl. No.: 17/346,098

(22) Filed: Jun. 11, 2021

(65) Prior Publication Data

US 2022/0398365 A1    Dec. 15, 2022

(51) Int. Cl.
*G06F 30/27* (2020.01)
*G06F 18/211* (2023.01)
(Continued)

(52) U.S. Cl.
CPC ............ *G06F 30/27* (2020.01); *G06F 18/211* (2023.01); *G06F 18/40* (2023.01); *G06N 20/00* (2019.01); *G06F 2111/20* (2020.01)

(58) Field of Classification Search
CPC ........ G06F 30/27; G06F 18/211; G06F 18/40; G06N 20/00
(Continued)

(56) References Cited

U.S. PATENT DOCUMENTS 8,914,141 B2 * 12/2014 Philpott ................. G06Q 10/04
  700/99
9,367,063 B2 * 6/2016 Herrman ............ G06Q 30/0635
(Continued)

FOREIGN PATENT DOCUMENTS

EP    3173955 A1    5/2017
EP    4102430 A1 * 12/2022    ........... B29C 64/386

OTHER PUBLICATIONS

Changchien et al. ("Concurrent Design of Machined Products: A Multivariate Decision Approach", IEEE, 2000, pp. 252-264) (Year: 2000).*

(Continued)

*Primary Examiner* — Iftekhar A Khan

(57) ABSTRACT

Aspects of the present disclosure provide systems, methods, and computer-readable storage media that support optimized product design processes. During the design process, information identifying a set of features for a product design are received and evaluated against machine learning logic to identify a set of components that includes components corresponding to the set of features. One or more candidate components may be identified as alternatives to one or more set of components based on the characteristics, and modifications to optimize (e.g., reduce cost, weight, etc.) the set of components may be determined based on at least one design metric and the one or more candidate components. A final set of components that are optimized with respect to the at least one design metric may be output.

16 Claims, 4 Drawing Sheets

(51) Int. Cl.
    *G06F 18/40*         (2023.01)
    *G06F 111/20*      (2020.01)
    *G06N 20/00*       (2019.01)

(58) Field of Classification Search
    USPC .......................................................... 703/6
    See application file for complete search history.

(56) References Cited

U.S. PATENT DOCUMENTS

| | | | | |
|---|---|---|---|---|
| 11,004,037 | B1 * | 5/2021 | Ling | G06N 20/00 |
| 11,783,397 | B2 * | 10/2023 | Gopalakrishnan | G06Q 30/0631 705/26.5 |
| 11,947,338 | B1 * | 4/2024 | Usui | G06F 30/17 |
| 11,982,989 | B2 * | 5/2024 | Deroo | G05B 19/40938 |
| 2002/0143667 | A1 * | 10/2002 | Ho | G06Q 10/087 705/28 |
| 2004/0236641 | A1 * | 11/2004 | Abbott | G06Q 10/0631 705/28 |
| 2007/0011062 | A1 * | 1/2007 | Eagle | G06Q 10/063 705/35 |
| 2009/0024647 | A1 * | 1/2009 | Hein | G06F 16/25 707/999.102 |
| 2015/0055086 | A1 * | 2/2015 | Fonte | H04L 65/403 700/98 |
| 2015/0127131 | A1 * | 5/2015 | Herrman | G06Q 30/0283 700/98 |
| 2015/0269289 | A1 * | 9/2015 | Kim | G06T 17/00 703/6 |
| 2015/0363513 | A1 * | 12/2015 | Cassel | G06F 30/00 703/1 |
| 2016/0034604 | A1 * | 2/2016 | Lin | G06F 30/00 703/1 |
| 2016/0371651 | A1 * | 12/2016 | Page | G06Q 30/0631 |
| 2018/0330029 | A1 * | 11/2018 | Pedersen | G06F 30/23 |
| 2019/0065629 | A1 * | 2/2019 | Phinney | G06F 30/20 |
| 2019/0347668 | A1 * | 11/2019 | Williams | G06F 18/23 |
| 2020/0013156 | A1 * | 1/2020 | Weiss | G06F 18/40 |
| 2020/0099804 | A1 * | 3/2020 | Iwase | H04N 1/00013 |
| 2020/0111018 | A1 * | 4/2020 | Golovin | G06F 11/3006 |
| 2020/0147889 | A1 * | 5/2020 | Dheeradhada | G06N 20/00 |
| 2020/0356899 | A1 * | 11/2020 | Rejeb Sfar | G06N 3/08 |
| 2020/0364310 | A1 * | 11/2020 | Reddy | G06F 30/00 |
| 2021/0004719 | A1 * | 1/2021 | Dupont De Dinechin | G06N 20/00 |
| 2021/0241866 | A1 * | 8/2021 | Bhattacharya | G06F 30/12 |
| 2021/0357555 | A1 * | 11/2021 | Liu | G06F 30/27 |
| 2021/0365614 | A1 * | 11/2021 | Sun | G06Q 50/04 |
| 2022/0035966 | A1 * | 2/2022 | McMinn | G06F 30/20 |
| 2022/0058526 | A1 * | 2/2022 | Boyle | G06Q 10/067 |
| 2022/0067228 | A1 * | 3/2022 | Anderson | G06F 30/13 |
| 2022/0108053 | A1 * | 4/2022 | Daware | G06T 17/20 |
| 2022/0146990 | A1 * | 5/2022 | Lammens | G05B 23/0283 |
| 2022/0214666 | A1 * | 7/2022 | King | G05B 19/4188 |
| 2022/0214668 | A1 * | 7/2022 | King | G05B 19/4183 |
| 2022/0299984 | A1 * | 9/2022 | Heesche | G05B 19/41885 |
| 2022/0390918 | A1 * | 12/2022 | Atev | G06F 30/27 |
| 2023/0004685 | A1 * | 1/2023 | Poulin | G06F 30/27 |

OTHER PUBLICATIONS

European Patent Office, Communication, Extended European Search Report for European Patent Application No. 22175276.9, dated Oct. 20, 2022, 11 pages.

\* cited by examiner

SYSTEMS AND METHODS FOR MACHINE LEARNING BASED PRODUCT DESIGN AUTOMATION AND OPTIMIZATION

TECHNICAL FIELD

The present disclosure relates generally to a product design and development methodology and more specifically to a machine learning (ML) based framework to automate and optimize product design and development.

BACKGROUND

Development of products often involves many complex processes, such as product design, prototyping, product testing, assembly, and the like. The design process presents a significant challenge for many products, especially complex products involving many different parts (e.g., cars, planes, boats, computer components, or other products). One of the challenges that occurs in existing design processes is part selection. To illustrate, for any particular part there may be multiple sources or many potentially viable parts with different features, dimensions, costs, etc. When such situations occur, a person conducting the design process may be prone to selecting parts with which they are familiar (e.g., parts they have used in the past, parts from a manufacturer they have worked with previously, and the like) or other personal biases based on the experience of the designer. While such techniques may result in adequate parts being selected for a product design, this type of selection or design process does not result an optimal product design with respect to the overall cost to manufacture the product or quality of the product. Additionally, the presently used manual design processes are also very time consuming, which can delay the time required to complete the design process and ultimately, production of the product. Despite being time consuming, the existing techniques are often performed in a non-exhaustive manner, meaning that many parts or components may not even be considered for a proposed design. The non-exhaustive nature of existing approaches results in many parts or components being overlooked and, in many instances, the overlooked parts or components may result in a more optimal design in terms of cost, fit, and/or function of the designed product.

SUMMARY

Aspects of the present disclosure provide systems, methods, apparatus, and computer-readable storage media that support optimized product design processes. During a process to design a product, information identifying a set of features for the product may be created. For example, a user or designer may utilize a designer device to compile a set of features relevant to the product's design. The set of features may include information derived from customer requirements (e.g., requirements for the product specified by the entity seeking to have the product produced), marketing requirements (e.g., what features are of interest to consumers, safety, etc.), engineering requirements (e.g., factors regarding the durability of the product, power requirements, etc.). Once product specifications are finalized, the set of features for the product being designed may be evaluated against machine learning logic to identify a set of components corresponding to the set of features. In an aspect, the set of components may include parts or components that are applicable to each of the different features, and the parts or components may be ordered or prioritized according to a correlation between each of the parts and the corresponding feature. In an additional aspect, the parts or components may be ordered or prioritized according to cost (e.g., lowest cost to highest cost or highest cost to lowest cost). The designer may then select components for the proposed design from the set of components identified by the machine learning logic to produce an engineering bill of materials (eBOM). It is noted that the parts or components included in the eBOM may not be optimized in terms of cost or other factors and instead may simply include components that the designer believed were well suited for the product design. The eBOM may then be analyzed to identify duplicate parts or components (if any) along with one or more candidate parts or components. The candidate parts or components may be potential substitutes or alternatives to the parts or components specified by the designer in the eBOM. The one or more candidate components may then be evaluated using one or more design metrics to optimize the product design. Evaluation of the candidate parts or components may include analysis of characteristics of the parts or components and evaluation of those characteristics against the one or more design metrics. For example, a design metric may specify that a part supporting a particular feature may be made from materials a, b, c and the designer may have selected a part that was made from material a, without consideration of whether a part made from materials b or c would result in a more optimal product design (e.g., maintain the product's structural integrity but reduce cost or weight). During evaluation of the candidate parts, embodiments of the present disclosure may automatically evaluate whether substitution of one of the candidate parts for a part specified in the eBOM would result in a more optimal design. As a result of the evaluation of the candidate parts or components, candidate parts and components may be identified that optimize the product design and modifications to the eBOM may be made to optimize the product design (e.g., reduce cost, reduce weight, improve performance, etc.). A final set of components optimized with respect to at least one design metric may be output, yielding an optimized product design that may then be used to manufacture the product in a more optimal manner. The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support automation and optimization of a process for designing a product. As will be described in more below, embodiments may provide functionality for automatically translating a set of design features specified for a product into a set of components that includes parts or components that are applicable to each of the different features of the set of design features. Such capabilities may be provided by leveraging machine learning logic to rapidly identify correlations between the different features and one or more parts or components. The set of components may be presented to a designer who may then select from among the identified parts or components to generate an initial eBOM for the product design. However, this eBOM may not be optimized or fully optimized with respect to one or more design metrics (e.g., cost, size, weight, and the like).

To enhance the product design, the initial eBOM may be subjected to further analysis to identify duplicate parts or components (if any) along with candidate parts or components that may be substituted for one or more of the parts or components included in the initial eBOM. For example, candidate components may be identified by evaluating differences between attributes of the parts or components identified in the initial eBOM and other known parts or components. The design metrics may specify criteria that may be used to determine whether a particular candidate part or component should be selected as a substitute for one of the parts or components of the initial eBOM. To illustrate, a weight metric may specify that a candidate part or component should be substituted for a part or component included in the initial eBOM if the candidate part or component has a lower weight, even if other parameters are the same. Through such analysis a final eBOM may be generated that is optimized with respect to the design metric(s) (e.g., produce a final eBOM that optimizes cost, weight, size, or other aspects of the designed product).

Figure 1:
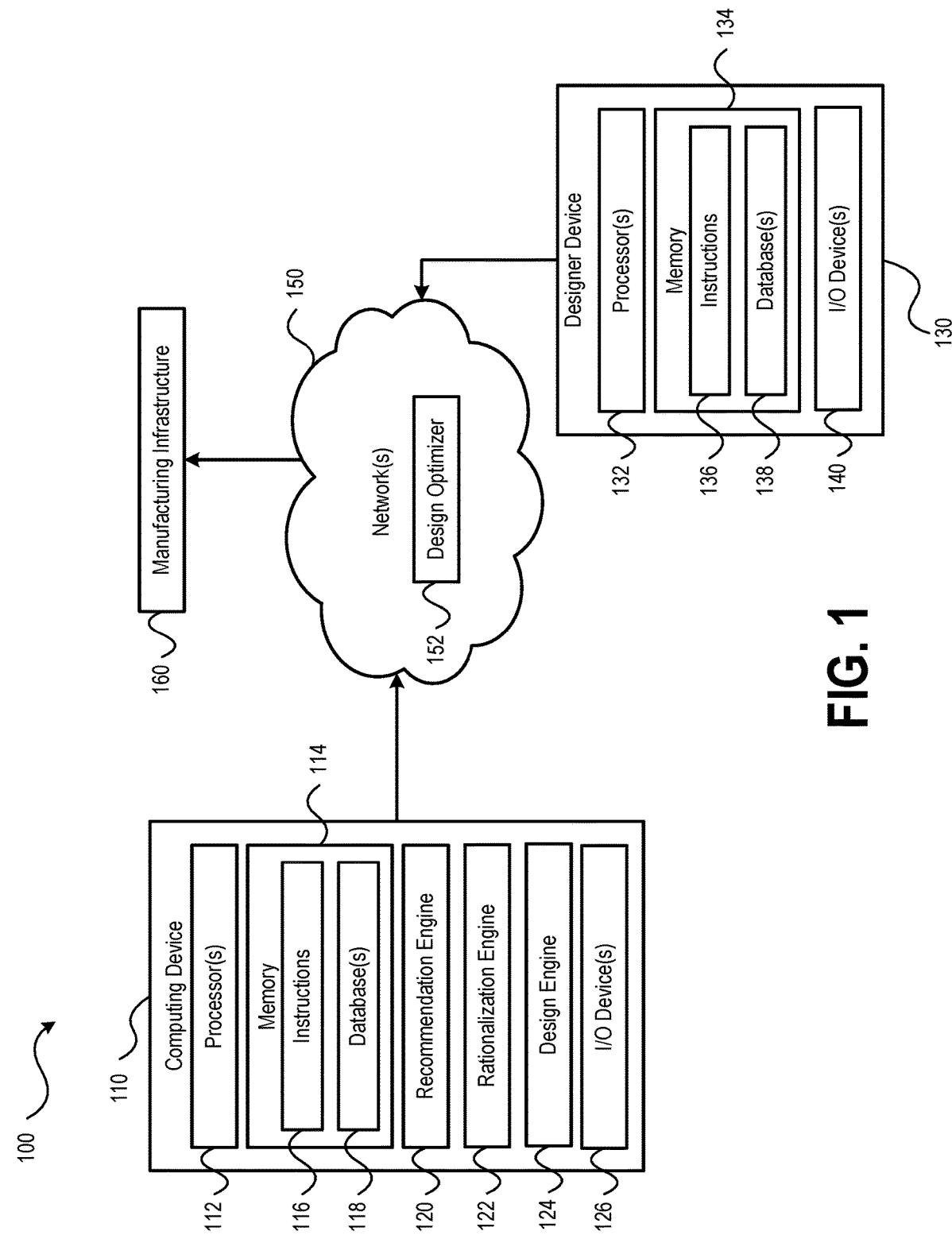
FIG. 1 is a block diagram of an example of a system that supports design processes in accordance with the present disclosure.

Referring to FIG. 1, an example of a system that supports design processes in accordance with the present disclosure is shown as a system 100. The system 100 may be configured to automate aspects of a product design process and in doing so, optimize the product's design with respect to one or more design metrics (e.g., cost, size, weight, and the like). As shown in FIG. 1, the system 100 includes a computing device 110 communicatively coupled to a designer device 130 via one or more networks 150. In some implementations, one or more of the devices shown in FIG. 1 may be optional. For example, the functionality described herein as being provided by the computing device 110 may be provided via a cloud-based deployment, as shown by design optimizer 152, or the system 100 may include additional components, such as the designer device 130, as a non-limiting example.

The computing device 110 may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. The computing device 110 includes one or more processors 112, a memory 114, a recommendation engine 120, a rationalization engine 122, a design engine 124, and one or more input/output (I/O) devices 126. In some other implementations, one or more of the components 112-126 may be optional, one or more additional components may be included in the computing device 110, or both. It is noted that functionalities described with reference to the computing device 110 are provided for purposes of illustration, rather than by way of limitation and that the exemplary functionalities described herein may be provided via other types of computing resource deployments. For example, in some implementations, computing resources and functionality described in connection with the computing device 110 may be provided in a distributed system using multiple servers or other computing devices, or in a cloud-based system using computing resources and functionality provided by a cloud-based environment that is accessible over a network, such as the one of the one or more networks 170. To illustrate, one or more operations described herein with reference to the computing device 110 may be performed by one or more servers or a design optimizer 152 that communicates with one or more client or user devices, such as the designer device 130. Additionally or alternatively, the functionality provided by computing device 110 may be provided by the designer device 130.

The one or more processors 112 may include one or more microcontrollers, application specific integrated circuits (ASICs), field programmable gate arrays (FPGAs), central processing units (CPUs) having one or more processing cores, or other circuitry and logic configured to facilitate the operations of the computing device 110 in accordance with aspects of the present disclosure. The memory 114 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the computing device 110 may be stored in the memory 114 as instructions 116 that, when executed by the one or more processors 112, cause the one or more processors 112 to perform the operations described herein with respect to the computing device 110, as described in more detail below. Additionally, the memory 114 may be configured to store data and information in one or more databases 118. Illustrative aspects of the one or more databases 118 are described in more detail below.

Although not shown in FIG. 1, the computing device 110 may include one or more communication interfaces configured to communicatively couple the computing device 110 to the one or more networks 150 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). The computing device 110 may also include one or more input/output (I/O) devices 126 that include one or more display devices, a keyboard, a stylus, one or more touchscreens, a mouse, a trackpad, a microphone, a camera, one or more speakers, haptic feedback devices, or other types of devices that enable a user to receive information from or provide information to the computing device 110. In some implementations, the computing device 110 is coupled to the display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the computing device 110.

As shown in FIG. 1, the computing device 110 may be communicatively coupled to the designer device 130. The designer device 130 includes one or more processors 132, a memory 134, and one or more I/O devices 140. The one or more processors 132 may include one or more microcontrollers, ASICs, FPGAs, CPUs having one or more processing cores, or other circuitry and logic configured to facilitate the operations of the designer device 130 in accordance with aspects of the present disclosure. The memory 134 may include RAM devices, ROM devices, EPROM, EEPROM, one or more HDDs, one or more SSDs, flash memory devices, NAS devices, or other memory devices configured to store data in a persistent or non-persistent state. Software configured to facilitate operations and functionality of the computing device 130 may be stored in the memory 134 as instructions 136 that, when executed by the one or more processors 132, cause the one or more processors 132 to perform the operations described herein with respect to the designer device 130, as described in more detail below. Additionally, the memory 134 may be configured to store data and information in one or more databases 138. Illustrative aspects of the one or more databases 138 are described in more detail below.

Although not shown in FIG. 1, the designer device 130 may include one or more communication interfaces configured to communicatively couple the designer device 130 to the one or more networks 150 via wired or wireless communication links established according to one or more communication protocols or standards (e.g., an Ethernet protocol, TCP/IP, an IEEE 802.11 protocol, an IEEE 802.16 protocol, a 3G communication standard, a 4G/LTE communication standard, a 5G communication standard, and the like). The one or more I/O devices 140 may include one or more display devices, a keyboard, a stylus, one or more touchscreens, a mouse, a trackpad, a microphone, a camera, one or more speakers, haptic feedback devices, or other types of devices that enable a user to receive information from or provide information to the designer device 130. In some implementations, the designer device 130 is coupled to the display device, such as a monitor, a display (e.g., a LCD or the like), a touch screen, a projector, a VR display, an AR display, an XR display, or the like. In some other implementations, the display device is included in or integrated in the designer device 130.

A user, such as a product designer, may utilize the designer device 130 to design products, such as vehicles, electronic devices, toys, or other tangible items. As part of the design process, the user may conduct a product feature gathering process to obtain information about the components and features of the product being designed. The product feature gathering process may involve obtaining inputs from a customer (e.g., a customer for which the product is being designed by a manufacturer), inputs obtained from market research involving other products on the market that are similar to the product being designed, or other types of information that may guide the design process (e.g., target product cost, product launch target, and the like). As an example, a designer involved in designing a new vehicle may obtain a list features for the vehicle, such as engine specifications, vehicle weight, seating capacity, climate control features (e.g., air conditioning, heated seats, cooled seats, and the like), audio/visual features (e.g., speaker configuration, video capabilities, camera capabilities, receiver capabilities), or other types of features and capabilities of the vehicle designs. In an aspect, the various features and capabilities obtained during the product feature gathering phase may be categorized (e.g., into must have and good to have features) and weights may be assigned for each of the features and capabilities. This information may be stored in a database, such as the one or more databases 138.

Figure 2:
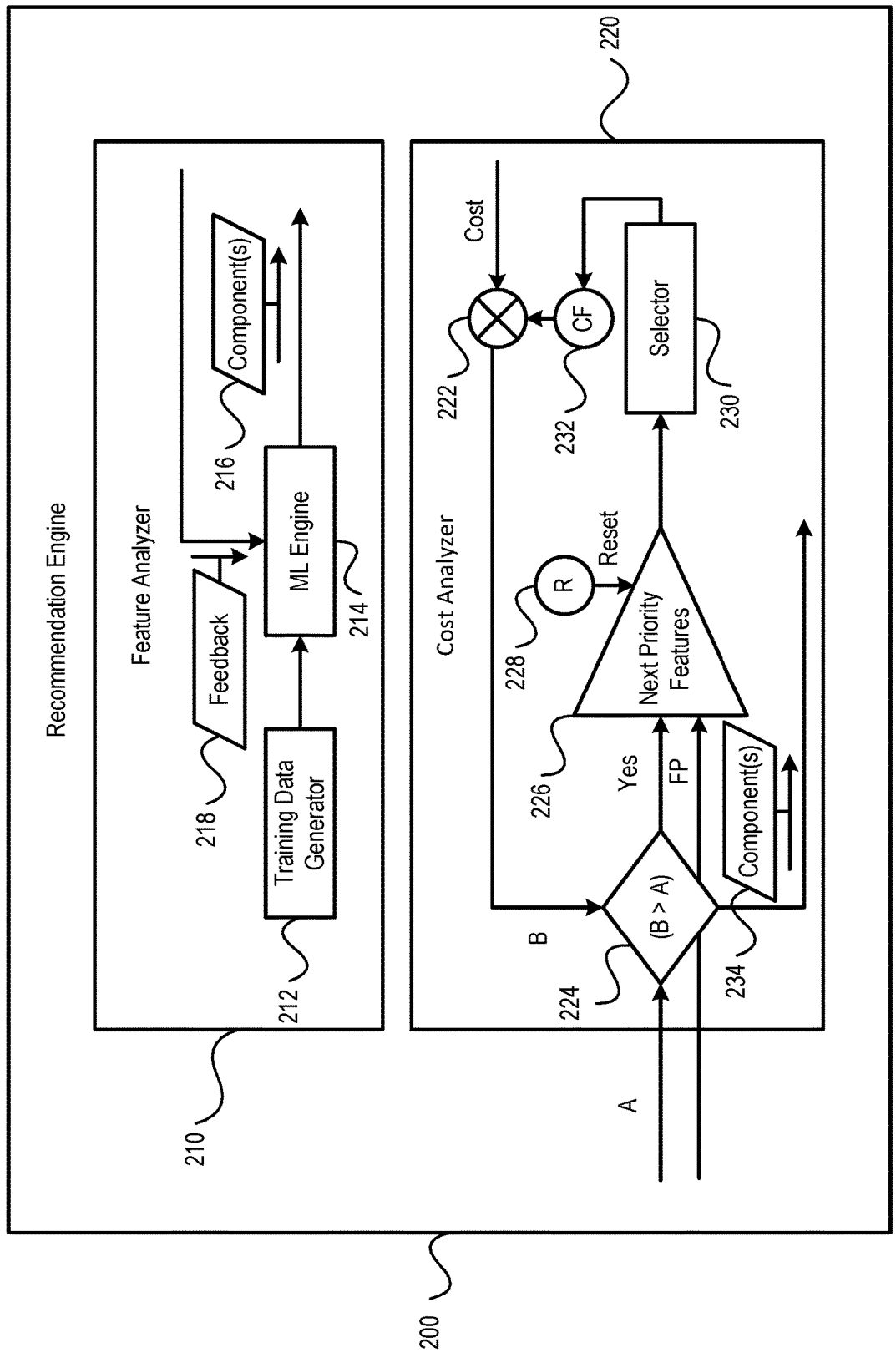
FIG. 2 shows a block diagram illustrating exemplary aspects of a design process in accordance with the present disclosure.

The set of features may then be provided as an input to the recommendation engine 120 of the computing device 110. The recommendation engine 120 may be configured to analyze the various features and capabilities compiled by the designer and output a set of parts or components that satisfy the set of features and capabilities specified for the product under design. The recommendation engine 120 may be configured to utilize various processes and operations to transform the input set of features and capabilities into the set of parts or components. For example, and referring to FIG. 2, a block diagram illustrating additional exemplary aspects of a design process in accordance with the present disclosure is shown. The particular operations of a design process shown in FIG. 2 may be performed by a recommendation engine 200, which may be the same as or similar to the recommendation engine 120 of FIG. 1. As shown in FIG. 2, the recommendation engine 200 includes a feature analyzer 210 and a cost analyzer 220.

The feature analyzer 210 may be configured to leverage machine learning techniques to identify a set of components that satisfy the features and capabilities specified for the product being designed. To illustrate, the feature analyzer 210 may include a training data generator 212 and a machine learning engine 214. The training data generator 212 may compile a training dataset that may be used to train a machine learning model of the machine learning engine 214. The training dataset may include information compiled from one or more databases, such as the one or more databases 118 of FIG. 1. For example, the one or more databases may include a library of component information, such as stock keeping unit (SKU) data, feature information associated with different components, information about different components across a variety of products, or other types of information. The SKU data may include identifying information for different components. It is noted that some components may be associated with multiple SKUs. For example, a manufacturer may acquire a component from different manufacturers and may assign different SKUs to each component (e.g., a first SKU for a component acquired from a first component manufacturer and a second SKU for a component acquired from a second component manufacturer). The feature information may include dimension information associated with various components (e.g., length, width, height, diameter, and the like), material characteristics of the various components (i.e., the type and properties of materials the components are made from), connectivity characteristics (e.g., information regarding threaded portions of components, snap fit components, pressure or friction fit components, and the like) that indicate different types of connections that may be used to secure the components in place or connect different ones of the components to each other, description of the components, or additional types of features of, or information about the various components. The information about different components across a variety of products may include information about component compatibility, such as components that have been incorporated into products together, components used in a family of products (e.g., all parts or components that may be classified as "rods" may be part of a "rods" family or products), and the like. It is noted that the exemplary types of information described above are provided for purposes of illustration, rather than by way of limitation and the library of component information may include additional information other than the specific examples provided above.

The feature analyzer 210 may select information from the one or more databases to create a training dataset that may be provided to the machine learning engine 214. The training dataset may be utilized by the machine learning engine 214 to train machine learning models to identify suitable components or parts for a proposed product design based on the features and capabilities information, such as the features and capabilities information compiled by the designer device 130. During training, features and capabilities information for a prior product design may be utilized by the machine learning engine 214 to train the machine learning model to identify the suitable parts or components based on features and capabilities information. For example, the features and capabilities information may indicate that a component should satisfy size and dimension requirements, materials requirements, or other information about the parts or components of the designed product. The machine learning model may be configured to identify parts or components suitable for the designed product from among the training dataset based on the features and capability information.

It is noted that the machine learning engine 214 may perform preprocessing operations with respect to the features and capability information. For example, the features and capability information may be written as natural language and subjected to natural language processing, vectorization, or other types of processing steps to transform the features and capability information of the designed product to a format that may be ingested into the machine learning model. As a non-limiting example, the preprocessing operations may transform the natural language data into processed data (e.g., one or more vectors of numerical values, etc.) and the machine learning model may be evaluated against the processed data to identify the parts of components satisfying the features and capability information. As part of the training of the model, the components identified during training may be evaluated and used to tune the model parameters. The tuning may be configured to improve the accuracy of the machine learning model and enable the model to more accurately identify parts or components that satisfy the features and capability information for a designed product.

It is noted that the training data generator 212 may be configured to output different types of training data. For example, the training data generator 212 may output a training dataset, a validation dataset, and a testing dataset. The training dataset may be utilized to train the model and the validation dataset may be utilized to validate the model. The testing dataset may then be used to test the validated model, which may include evaluating the model against the testing dataset following tuning based on the feedback 218 (or one or more iterations of the feedback 218).

In some aspects, a designer feedback loop may be utilized to generate the feedback 218. The designer feedback loop may be configured to analyze selections of parts or components by designers and determine promotion and/or penalization factors that may be used to adjust the machine learning model of the machine learning engine 214 to improve the model's outputs. In an aspect, the feedback loop algorithm may be configured to consider a plurality of different factors, such as a distance between the chosen and suggested parts, a number of times a same part is chosen or not chosen, information about a family or non-family product, failures reported for a particular suggested part or component (e.g., from post sales data), or other factors For example, the promotion factor may be configured to tune the machine learning model to provide higher correlation coefficients for parts selected by designers, such as parts that are selected by a designer despite having a lower correlation coefficient than other parts. The penalization factor may be configured to penalize or decrease the correlation coefficients output by the machine learning model for parts or components when a failure is reported for a particular part or component, when designer continually select other parts or components having lower correlation coefficients than other parts or components, or for other factors.

As a non-limiting an illustrative example of a designer feedback loop in accordance with aspects of the present disclosure, let $b_{1, 2, 3, \ldots, n}$ be the list of suggested parts (e.g., the parts or components output by the model) for a particular feature for a SKU, and let $a_{1, 2, 3, \ldots, n}^j$ be the list of correlation coefficients for the suggested list of parts for a feature j, such that $a_1^j > a_2^j > a_n^j > \ldots > a_n^j$ (for a coefficient grading scale from 0-1). The cumulative promotion factor $\alpha$ for a chosen part for each feature j and may be calculated as:

$$\alpha = \max\left[\left(\min\left\{\left(\frac{a_1^j - a_k^j}{3}\right)^{(k-1)1/(k-1)}, \left(\frac{a_1^j - a_k^j}{3}\right)\right\} + \left(Y \times \min\left\{\left(\frac{a_1^j - a_k^j}{3}\right)^{(c)1/c}, \left(\frac{a_1^j - a_k^j}{3}\right)\right\}\right) - \min\left\{\left(\frac{1}{x}\right)^{(x/3)}, 1\right\}, 0\right] \quad (1)$$

The cumulative promotion factor $\beta_n$ for a non-chosen part for each feature j and may be calculated as:

$$\beta_n = \max\left[\left(\min\left\{\left(\frac{a_{ni}^j - a_k^j}{3}\right)^{(k-ni)1/(k-ni)}, \left(\frac{a_{ni}^j - a_k^j}{3}\right)\right\} + \left(Y \times \min\left\{\left(\frac{|a_n^j - a_k^j|}{3}\right)^{(d)1/d}, \left(\frac{|a_n^j - a_k^j|}{3}\right)\right\}\right) - \min\left\{\left(\frac{1}{x}\right)^{(x/3)}, 1\right\}, 0\right] \quad (2)$$

In Equations (1) and (2) above, n=1, 2, 3, . . . , n represent the non-chosen part(s), ni=1, 2, 3, . . . , ni represent the non-chosen part(s) with correlation coefficient that is greater than (>) the chosen part(s), k denotes the chosen part, such that k is not equal to 1, c is the number of times a particular suggested part is chosen, d is the number of times a particular suggested part is not chosen, Y is a multiplication factor, such that for same family of product Y=1.2 and for non-family of product Y=1, and x is the penalty factor such that the failure rate penalty factor (x) may be:

0-5%—10
5-10%—8
10-20%—6
20-40%—4
40-80%—2
80-100%—1

It is noted that in Equations (1) and (2) above, the term "part" may also include components or/and sub-assemblies. It is also noted that the exemplary equations shown above are provided for purposes of illustration, rather than by way of limitation and that other techniques to calculate penalty and promotion factors may be utilized by embodiments of the present disclosure.

Once the model is validated and determined to perform at a satisfactory level (e.g., based on the testing dataset), the model may be evaluated against feature and capability information of a newly designed product, such as a product designed via the designer device 130 of FIG. 1. For example, the machine learning engine 214 may be provided with features and capabilities information for the newly designed product, such as the features and capabilities information described above with respect to the designer device 130 of FIG. 1. The features and capabilities information may be subjected to preprocessing operations as described above to produce model input data (i.e., data that has been transformed into a format suitable for evaluated by the machine learning model). Once the preprocessing is complete, the model input data may be evaluated against the trained machine learning model to produce a model output. In an aspect, the model output may include set of components 216. The set of components 216 may correspond to parts or components that satisfy the features and capabilities specified for the newly designed product.

In an aspect, the set of components 216 may include information regarding the identified parts or components, such as feature information, cost information, SKU information, dimension information, or other types of information about the parts identified by the machine learning model. The information included in the set of components 216 may be extracted from the one or more databases. For example, the model outputs may include a set of values (e.g., SKU values, numerical values, or other types of identifying information) corresponding to the parts or components identified by the machine learning model as satisfying the features and capabilities information. The set of values may be mapped to parts or components for which information is stored in the one or more databases. Information about the identified parts or components (e.g., feature information, dimension information, material information, etc.) may then be extracted from the one or more databases based on the set of values and this information may be presented to a user, such as a user of the designer device 130 of FIG. 1. In an additional or alternative aspect, the set of components 216 identified by the machine learning engine 214 may be provided to an external device, such as the designer device 130 of FIG. 1, and the external device may utilize the information included in the set of components 216 (e.g., the above-described set of values) to extract the information from the one or more databases for presentation to the user. It is noted that one or more of the parts or components identified in the set of components 216 may not be unique and that such non-unique parts or components have features or characteristics that are the same or substantially similar to each other. This may occur because, as explained above, a product manufacturer may source parts or components from different component manufacturers, which may result in multiple parts being identified in the set of components 216 that have the same or similar characteristics or features. Because of the possibility of multiple parts or components that are the same or substantially similar is identified by the machine learning module 214, the designer may have a difficult time selecting a specific subset of the parts of components to be used to manufacture the newly designed product. Such difficulties may create delays in the design process and may ultimately result in selection of components or parts that are less than optimal for producing the intended product, as described in more detail below.

In some aspects, the machine learning engine may output a set of correlation coefficients based on the machine learning model. The set of correlation coefficients may indicate a correlation between one or more parts and components and a particular feature of capability of the set of features or capabilities. For example, the set of correlation coefficients may indicate correlations between a first set of parts or components and a first feature or capability of the newly designed product, correlations between a second set of parts or components and a second feature or capability of the newly designed product, and so on for n features or capabilities of the newly designed product, where n≥1. The correlation coefficients may be utilized to rank the parts or components with respect to each of the features or capabilities of the newly designed product, and the designer may then select a subset of the parts or components as a candidate set of parts or components. As described in more detail below, the cost analyzer 220 may then be utilized to evaluate one or more sets of candidate parts or components, which may include taking into account prioritization information associated with different features or capabilities of the products.

In some aspects, the recommendation engine 200 or another component (e.g., of the computing device 110) or an external device (e.g., the designer device 130 of FIG. 1), may obtain information associated with the cost of each part or component identified in the set of components 216. The cost analyzer 220 may be configured to perform a cost analysis on the set of components 216. More particularly, the cost analyzer 220 may be configured to evaluate the parts or components suggested for the newly designed product based on a "should cost" value, which may represent a target cost to manufacture the newly designed product. Exemplary aspects of performing a "should cost" value analysis are described in more detail below.

As shown in FIG. 2, the cost analyzer 220 may include cost logic 222, evaluation logic 224, priority logic 226, reset logic 228, selection logic 230, and cost function logic 232. The cost logic 222 may be configured to receive cost information associated with the parts or components identified by the feature analyzer 210. In an aspect, the cost information may be associated with a subset of the parts or components identified in the set of components 216. For example, the designer may review the set of components 216 and select particular parts or components as candidate parts or components. In such an example, the cost information may include the cost associated with each candidate part (i.e., the parts selected by the designer for use in producing the product) selected by the designer. In another example, the correlation coefficients associated with the parts or components and the features and capabilities of the designed product may be utilized to select the parts or components. For example, the parts having the highest correlation coefficients for each feature or capability may be selected as candidate parts or components for the newly designed product.

The cost logic 222 may calculate a sum (B) of the cost to produce the newly designed product using the cost information associated with the candidate parts or components. The summed cost (B) may be provided to the evaluation logic 224. In addition to the summed cost (B), the evaluation logic 224 may also receive information associated with a "should cost" (A). The "should cost" (A) may be determined based on input from a customer (e.g., the entity requesting production of the newly designed product), as well as information from other sources (e.g., an engineering team, a marketing team, or other sources). The evaluation logic 224 may determine whether the summed cost (B) is greater than (>) the "should cost" (A). If the summed cost (B) is not greater than (>) the "should cost" (A) (e.g., B≤A), operations of the cost analyzer may be complete and a final set of candidate components 234 may be output by the cost analyzer 220.

If the summed cost (B) is greater than (>) the "should cost" (A), operations of the cost analyzer 220 may proceed to priority logic 226, which may be configured to evaluate the set of candidate parts or components (e.g., the set of candidate parts or components selected by the designer from among the components 216, or a subsequent iteration of the cost analyzer 220) based on feature prioritization data (FP). The feature prioritization data may be specified based on inputs from the designer, the customer, other entities or users, or a combination thereof and provide a priority or ranking for different features or capabilities of the product undergoing the design process. The priority logic 226 may be configured to identify a lowest priority feature from among the features or capabilities of the product being designed. As explained in more detail below, identifying the next lowest set of features may enable a different set of candidate parts corresponding to the next lowest priority feature or capability, which may have a lower cost. In an aspect, the cost analyzer 220 may include the reset logic 228 configured to reset the prioritization logic 226 in between iterations or each time that the condition B≤A is satisfied. The cost analyzer checks if B>A, in that case for each feature (priority-wise) it considers the penultimate component (coefficient-wise) and finds the subsequent sum. This process may continue until B≤A. In a case where the cost analyzer runs through the penultimate components of all the features and still B>A, then the reset logic 228 resets the counter for the feature list, such that this time the loop runs from the first feature as was in the case with the first iteration and this time penultimate component with respect to the ones considered in the previous loop are taken up.

The priority logic 226 may provide information regarding the next lowest priority feature or capability to the selection logic 230. The selection logic 230 may select a new set of candidate parts or components, which may include new parts or components corresponding to the next lowest priority feature and having a lower cost than the parts or components considered previously. The selection logic 230 may be configured to select the new candidate parts or components from among the parts or components identified by the feature analyzer 210. For example, the selection logic 230 may select one or more parts having a next highest correlation to the applicable features or capabilities under consideration (e.g., the features or capabilities identified by the selection logic 230).

The selection logic 230 may provide the new set of components to a cost function 232 that may provide information to the cost logic 222. The cost logic 222 may generate a summed cost (B') based on the new set of parts or components determined by the selection logic 230, which may have a different cost than the parts or components considered in the previous iteration. As described above, the summed cost (B') may be provided the evaluation logic 224 evaluated against the "should cost" (A). If the summed cost (B') is less than or equal to (≤) the "should cost" (A) (e.g., B'≤A), operations of the cost analyzer may be complete and a final set of candidate components 234 may be output by the cost analyzer 220. If the summed cost (B') is greater than (>) the "should cost" (A) (e.g., B'>A), operations of the cost analyzer 220 may proceed to priority logic 226 where a next lowest priority feature or capability may be selected and the above-described iterations may continue until a set of parts or components satisfying the condition B≤A is identified or all features or capabilities have been considered. The set of components 234 may be provided to a designer device (e.g., the designer device 130) and the designer may generate an initial eBOM by selecting parts or components from among the parts or components identified in the set of components 234. The eBOM may include a list of parts or components that correspond to the features or capabilities of the product being designed and that are less than or equal to the "should cost" (A).

Referring back to FIG. 1, the eBOM generated by the designer using the designer device 130 may represent a preliminary set of parts or components that may be used to produce the product being designed. The eBOM may be provided to the rationalization engine 122, which may be configured to optimize the eBOM across a variety of factors. For example, the rationalization engine 122 may be configured to identify substitute parts or components for one or more parts or components identified in the eBOM. Identification of the substitute parts may include identifying parts that are different than the parts identified in the eBOM with respect to attributes, dimensions, or cost. Additionally, the rationalization engine 122 may be configured to identify parts that are included in the eBOM (or the substitute parts) that are 3D printable. The ability to identify parts that are 3D printable may be advantageous in several respects. First, 3D printing may enable a new part or component design to be realized faster than other manufacturing techniques, which may enable the designed product to be produced or brought to market more quickly (e.g., because the manufacturer does not have to establish new infrastructure to product the new component or find a vendor that can produce the new component). Second, there may be instances where a part may be produced using non-3D printing techniques but producing the part via 3D printing techniques may result in a cost savings. The identification of the substitute parts by the rationalization engine 122 may result in a new eBOM that identifies a set of parts or components that includes at least some of the substitute parts and/or 3D printable parts. The parts or components identified in the eBOM generated by the rationalization engine 122 may reduce the cost to manufacture the newly designed product (e.g., because the substitute parts or components may be cheaper than the original parts or components of the initial eBOM generated as a result of the processes performed by the recommendation engine 120). Additionally, the rationalization engine 122 may also be configured to optimize the parts or components of the eBOM across metrics other than cost. For example, during identification of substitute parts the rationalization engine 122 may identify parts that may reduce the weight of the product (e.g., by substituting a plastic part for a steel part where appropriate).

Figure 3:
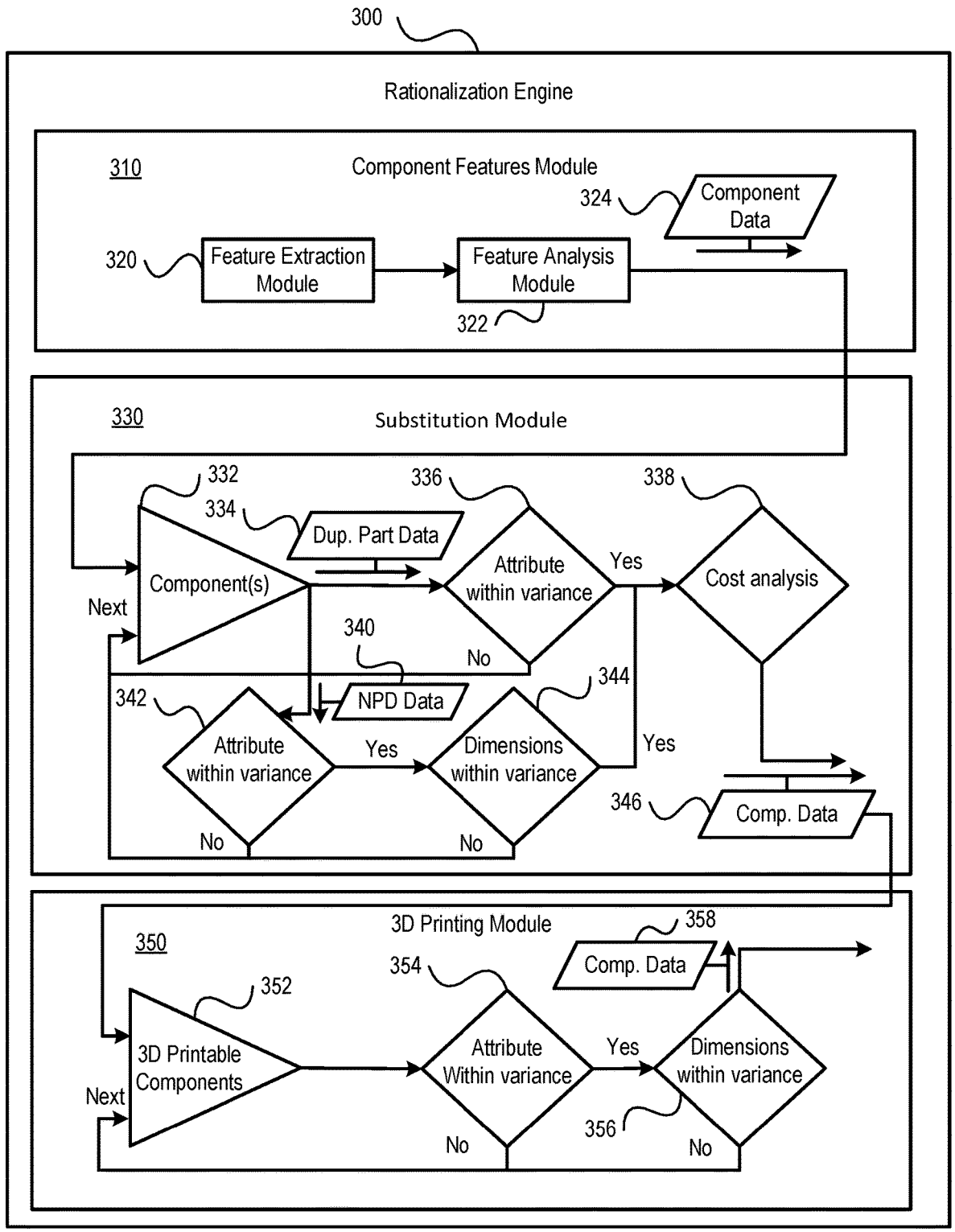
FIG. 3 shows a block diagram illustrating additional exemplary aspects of a design process in accordance with the present disclosure.

As an illustrative example, and referring to FIG. 3, a block diagram illustrating additional exemplary aspects of a design processes in accordance with the present disclosure are shown. The particular operations of a design process shown in FIG. 2 may be performed by a rationalization engine 300, which may be the same as or similar to the rationalization engine 122 of FIG. 1. As shown in FIG. 3, the rationalization engine 300 includes a component features module 310, a substitution module 330, and a 3D printer module 350, each of which is described in more detail below.

The component features module 310 may be configured to identify duplicate parts or components within an eBOM, such as the eBOM generated upon completion of processing by the recommendation engine 120 of FIG. 1 or the recommendation engine 200 of FIG. 2. The component features module 310 may include a feature extraction module 320 and a feature analysis module 322. The feature extraction module 320 may be configured to receive the eBOM as an input and output a dataset that includes information that identifies the different parts or components in the eBOM. For example, the dataset output by the feature extraction module 320 may include identification information for each part or component included in the eBOM, as well as a description or other information about the parts or components.

The dataset output by the feature extraction module 320 may be provided to the feature analysis module 322 for analysis. The analysis performed by the feature analysis module 322 may include identification of duplicate and non-duplicate parts or components. For example, the feature analysis module 322 may utilize one or more algorithms to analyze text and other types of information included in the dataset to identify different characteristics or features of each part or component. Exemplary characteristics or features that may be evaluated by the feature analysis module 322 include: part name, part description, material attributes, creation date, dimensions, a number of materials included in the part or component, material group information, stock or inventory data, cost data, supplier data (e.g., one or more suppliers that supply the part or component), part group information, weight information (e.g., a weight of the part or component, a weight that may be supported by the component, etc.), or other types of information. It is noted that the types of information analyzed by the feature analysis module 322 described above have been provided for purposes of illustration, rather than by way of limitation and that feature analysis modules in accordance with the present disclosure may analyze all of the types of information listed above, a subset of the types of information listed above, additional types of information, or combinations thereof.

During analysis of the features, the feature analysis module 322 may identify a set of zero or more duplicate parts or components and a set of zero or more non-duplicate parts or components based on the set of parts or components identified in the eBOM. The duplicate parts or components may be parts or components that are identified as having features that are the same as or similar to attributes and characteristics of a part or component identified in the eBOM. The non-duplicate parts or components may correspond to parts or components identified in the eBOM for which no other parts can be found having the same or similar attributes and characteristics. It is noted that the feature analysis module 322 may utilize the eBOM to identify the features (e.g., attributes and characteristics) of interest and then evaluate features of parts or components that are not identified in the eBOM but share the same or similar characteristics with the parts or components of the eBOM. For example, the duplicate parts may be identified based on information about parts or components stored in one or more databases (e.g., the one or more databases 118 of FIG. 1), and the non-duplicate parts or components may correspond to parts or components for which no other parts or components sharing the same or similar characteristics could be identified from the one or more databases.

The identification of duplicate and non-duplicate parts or components may be achieved via analysis of the characteristics or features output by the feature extraction module 320. For example, a duplicate part or component may be identified where characteristics or features of a first part or component of the eBOM are the same as or substantially similar to a second part or component of the eBOM, and a non-duplicate part or component may be identified where characteristics or features of a particular part or component of the eBOM are not the same as and are not substantially similar to other parts or components of the eBOM. It is noted that two parts may be substantially similar despite the features or characteristics being different in one or more respects (e.g., different descriptions, different supplier data, different stock or inventory data, and the like).

In addition to identifying duplicate and non-duplicate parts, the component features module 310 and the processes performed by the feature extraction module 320 and the feature analysis module 322 may also identify whether any of the parts or components identified in the eBOM are 3D printable. Knowing whether any of the parts or components are 3D printable may be beneficial as it may impact production times (e.g., due to the duration of time required to print the parts or components or other reasons). Additional aspects of analyzing 3D printable components are described in more detail below.

In an aspect, the feature analysis module 322 may utilize various techniques to analyze the characteristics or features of the parts or components identified in the eBOM. For example, the characteristics or features of the parts or components may be represented as strings of characters and the feature analysis module 322 may utilize a Levenshtein algorithm to determine a distance between different strings of characters corresponding to different parts or components. The distance may represent a metric of the similarity between two strings of characters (e.g., the features or characteristics of a first part or component and the features or characteristics of a second part or component). Additionally or alternatively, the feature analysis module 322 may utilize other techniques to analyze the features or characteristics of parts or components, such as phonetics algorithms, Jaro-Winkler distance algorithms, or other fuzzy string searching techniques. It is noted that the exemplary algorithms disclosed herein have been provided for purposes of illustration, rather than by way of limitation and that feature analysis modules of the present disclosure may utilize other algorithms and techniques to identify duplicate and non-duplicate parts from an eBOM.

As shown in FIG. 3, the component features module 310 may output a set of component data 324, which may include information that identifies the set of zero or more duplicate parts or components of the eBOM and the set of zero of more non-duplicate parts or components of the eBOM. The set of component data 324 may be provided to a substitution module 330 for analysis by component logic 332. The component logic 332 may be configured to provide duplicate part data 334 to the attribute variance logic 336. The duplicate part data 334 may correspond to features or characteristics of a particular part or component selected from the zero or more duplicate components. The attribute variance logic 336 may be configured to determine whether a particular part or component is within an attribute variance (or tolerance) for the product being designed. The attribute variance (or tolerance) may specify variances with respect to various attributes of the parts or components. For example, the eBOM may specify a part or component that is made from a first material, but a part or component made from another material may be acceptable (e.g., based on the properties of the two different materials, such as tensile strength, insulating or conductive properties, and the like). If the particular part or component under consideration by the attribute variance logic 336 is not within the attribute variance (e.g., one of the acceptable materials, etc.), the component logic 332 may select a next duplicate part for evaluation by the attribute variance logic 336 and provide updated duplicate part data 334 associated with the next duplicate part to the attribute variance logic 336. If the particular part or component under consideration by the attribute variance logic 336 is within the attribute variance (or tolerance), the particular part or component may be provided to cost analysis logic 338, where a cost of the particular part or component may be evaluated with respect to a selected part or component from the eBOM to determine whether the particular (duplicate) part or component has a lower cost than the selected part or component of the eBOM. Also, where a duplicate part or component having a lower cost than the part identified in the eBOM is found, the lower cost of the duplicate part may be considered by the cost analysis logic 338 during subsequent iterations. This process may continue in an iterative fashion until all duplicate parts have been evaluated by the attribute variance logic 336 and where appropriate, the cost analysis logic 338.

Similarly, the component logic 332 may provide non-duplicate part data 340 to the attribute variance logic 342. The non-duplicate part data 340 may correspond to features or characteristics of a particular part or component selected from the zero or more non-duplicate components. The attribute variance logic 342 may be configured to determine whether a particular non-duplicate part or component is within an attribute variance (or tolerance) for the product being designed, as described above with reference to the attribute variance logic 336. For example, the attribute variance logic 342 may evaluate features or attributes of parts or components not identified in the eBOM against features or attributes of a non-duplicate part identified in the eBOM to determine whether a near-identical part is available that is within the attribute variance specified for the non-duplicate part under consideration. In an aspect, the features or attributes of the one or more parts or components not identified in the eBOM may be derived from information stored in one or more databases (e.g., the one or more databases 118 of FIG. 1). If the particular part or component under consideration by the attribute variance logic 342 is not within the attribute variance, the component logic 332 may select a next non-duplicate part for evaluation by the attribute variance logic 342 and provide updated non-duplicate part data 340 associated with the next non-duplicate part to the attribute variance logic 342.

If the particular part or component under consideration by the attribute variance logic 342 is within the attribute variance (or tolerance), information associated with the particular part or component may be provided to dimensions variance logic 344. The dimensions variance logic 344 may be configured to determine whether the particular part or component satisfies a dimensions variance (or tolerance) for the designed product. For example, the product design may specify that a particular part or component, such as a rod, should have dimensions of: 10 millimeters (mm) long and 5 mm in diameter, but that parts within a variance of ±10% (e.g., 9-11 mm in length and/or 4.5-5.5 mm in diameters) may be utilized. In this example, the dimensions variance logic 344 may determine whether the particular part has dimensions within the specified variance (e.g., are the dimensions of the particular part or component output by the attribute variance logic within the dimensions of 9-11 mm in length and/or 4.5-5.5 mm in diameters). If the dimensions of the particular part or component are within the variance specified for the design, the component logic 332 may select a next non-duplicate part by the attribute variance logic 342 and provide updated non-duplicate part data 340 associated with the next non-duplicate part to the attribute variance logic 342. If the dimensions of the particular part or component are within the variance specified for the design, the dimensions variance logic 344 may provide information associated with the particular part or component to the cost analysis logic 338, where a cost of the particular part or component may be evaluated with respect to a selected part or component from the eBOM to determine whether the particular part or component has a lower cost than the selected non-duplicate part or component of the eBOM. Also, where a part or component having a lower cost than the part identified in the eBOM is found, the lower cost may be considered by the cost analysis logic 338 during subsequent iterations. This process may continue in an iterative fashion until all non-duplicate parts have been evaluated by the attribute variance logic 342 and where appropriate, the dimension variance logic 344 and the cost analysis logic 338.

As shown in FIG. 3, the rationalization engine 300 may include a 3D printing module 350. The portion of the set of component data 346 that includes information that identifies the 3D printable parts or components from the eBOM may be provided to the 3D printing module 350 for analysis by component logic 352. The component logic 352 may be configured to provide information to the attribute variance logic 354 associated with features or characteristics of a particular part or component selected from the 3D printable parts or components. The attribute variance logic 354 may be configured to determine whether a particular 3D printable part or component is within an attribute variance (or tolerance) for the product being designed, as described above with reference to the attribute variance modules 336 and 342. If the particular 3D printable part or component under consideration by the attribute variance logic 354 is not within the attribute variance, the component logic 352 may select a next 3D printable part or component for evaluation by the attribute variance logic 354 and provide updated 3D printable part or component data associated with the next 3D printable part to the attribute variance logic 354. If the 3D printable particular part or component under consideration by the attribute variance logic 354 is within the attribute variance (or tolerance), the particular 3D printable part or component may be provided to dimensions variance logic 356, which may be configured to determine whether a particular 3D printable part or component is within a specified dimensions variance (or tolerance) for the product being designed, as described above with reference to the dimension variance module 344. In some aspects, the 3D printing module 350 may also be configured to utilize cost logic to evaluate whether a near-identical 3D printable part identified by the attribute variance module 354 and the dimensions variance module 356 is associated with a cheaper cost than a 3D printable part identified in the eBOM or a previous iteration of the analysis performed by the 3D printing module 350. In some aspects, operations of one or more of the component logic 352, the attribute variance logic 354, and the dimensions variance logic 356 may include analysis of 3D printing files, metadata associated with 3D printing files, or other types of information associated with 3D printable parts or components. Exemplary aspects of analyzing 3D printing files are described in commonly owned U.S. Pat. No. 10,520,922, filed Mar. 9, 2018, and entitled "DECENTRALIZED SUPPLY CHAIN FOR THREE-DIMENSIONAL PRINTING BASED ON DISTRIBUTED LEDGER TECHNOLOGY," the content of which is incorporated herein by reference in its entirety.

Via the above-described operations of the component features module 310, the substitution module 330, and the 3D printing module 350, the rationalization engine 300 may produce various types of data (e.g., the component data 324, 346, 358) that may provide insights into a product design and optimize and reduce the cost to produce the designed product. It is noted that while the substitution module 330, and the 3D printing module 350 have been described primarily with respect to optimizing the parts or components with respect to cost, embodiments of the rationalization engine 300 may also be configured to optimize product designs based on other factors, such as weight. For example, instead of, or in addition to comparing the cost of candidate components or parts (e.g., parts identified by the substitution module 330, and the 3D printing module 350), the rationalization engine 300 may also evaluate whether a candidate component has a lower weight than the component that is to be potentially replaced by the candidate component. Where the weight of the product is reduced, the candidate component may be substituted for the previously specified component, thereby reducing the overall weight of the product. The ability to optimize product designs based on weight, or both weight and cost, may be advantageous when the weight of a product is an important factor in the overall design.

While the description of FIG. 3 above illustrates operations of the rationalization engine 300 conceptually, the above-described operations may also be represented mathematically. For example, assuming $F_i$ denotes different SKUs of a specific product, where i=1, 2, 3, ..., n (n=number of SKUs); $C_j$ denotes different components across several SKUs of a product, where j=1, 2, 3, ..., m, where m=the number of components; $H_k$ denotes different features across SKUs of a product, where k=1, 2, 3 ... o (o=number of features); $F_x$ denotes required SKU; $H_p$ denotes required features, where p=1, 2, 3 ... l, where l=the number of features. Letting $a_j^k$ be the coefficient of each component across features denoting the applicability of a component for a feature, such that $-1 < a_j^k < 1$. Then, for each $H_p = H_k$, $a_j^k$ denotes the correlation coefficient of each component to that feature.

To determine the coefficient $a_j^k$, the system may be trained with a specific set of values. In an aspect, the training may be associated with the machine learning module 214 of FIG. 2. Once trained, a machine learning model or technique may be used to predict the actual coefficient value. In an aspect, the machine learning technique may include polynomial regression.

Assuming $a_{j\ actual}^k = b_0 + b_1 x + b_2 x^2 + \ldots + b_0 x^n$, then $a_{j\ predicted}^k = b_0 + b_1 x + b_2 x^2 + \ldots + b_0 x^n + e$, where e=residual error. An error function J(e) may be defined as:

$$J(e) = \frac{1}{2} \Sigma_{j=1}^{n} (a_{j\ predicted}^k - a_{j\ actual}^k)^2, \quad (3)$$

where J(e) is the error function. The objective is to reduce the error function as much as possible.

$$\frac{\partial J(e)}{\partial x} = \frac{\partial \frac{1}{2} \sum_{j=1}^{n} \left(a_{j\ predicted}^k - a_{j\ actual}^k\right)^2}{\partial x}, \quad (4)$$

Solving $$\frac{\partial J(e)}{\partial x} = 0$$

and keeping $$\frac{\partial^2 J(e)}{\partial x^2} > 0,$$

predicted values of $a_j^k$ across components for any new feature that comes up may be obtained and used to train the system accordingly. Over a period, all such correlation coefficients can be calculated to establish a relationship between component and features. Higher predicted values of $a_j^k$ may indicate that a particular component is more aligned with the corresponding feature. Components with values of $a_j^k$ predicted between (−1–0.3) may be ignored since they are less likely to be related. This capability may be used to suggest a list of most applicable components for a set of features needed to develop a SKU or product to the designer. A graphical user interface may be presented to the user to allow the user (e.g., the designer) to review the coefficients indicative of relationships between components and features. The graphical user interface may include an option that allows the user to enter a revised coefficient value in place of the predicted coefficient value if the user finds that the revised coefficient value is more reflective of the relationship between the features and components. It is noted that any revised coefficients may be captured or incorporated into the machine learning model so that the revised coefficients may be output in a manner that is more accurate.

To perform "should costing" in accordance with aspects of the present disclosure, let O denote a function such that $O(C_j)$=the cost of the component $C_j$, where j=1, 2, 3, ..., n, and where n represents the number of components (e.g., available in the one or more databases). Let M denote a function which returns corresponding components based on a correlation coefficient between a component and a feature given as input, where M may be expressed as $M(a_j^k)=C_j$. It is noted that $M(a_j^k)$ may return multiple components, such as $C_1, C_2, C_3$, and so on where each of the multiple components is correlated to the feature under consideration.

Letting high performance cost ($G_{pc}$) represent the cost of the most applicable component considered for the product design, a list of high performance cost components=$L_{pc}$ may be determined, where $G_{pc}$ may be defined as:

$$G_{pc} \Sigma^n(O(M(max(a_a^1, a_2^1, a_3^1, \ldots, a_j^1)))) + \Sigma^n(O(M(max(a_1^2, a_2^2, a_3^2, \ldots, a_j^2)))) + \Sigma_n(O(M(max(a_1^3, a_2^3, a_3^3, \ldots, a_j^2)))) + \ldots + \Sigma^n(O(M(max(a_1^k, a_2^k, a_3^k, \ldots, a_j^k)))) \quad (5)$$

where n represents the number of components function M returns, and where $L_{pc}$ may be defined as:

$$L_{pc}=M(max(a_1^1,a_2^1,a_3^1,\ldots,a_j^1)),M(max(a_1^2,a_2^2,a_3^2,\ldots,a_j^2)),M(max(a_1^3,a_2^3,a_3^3,\ldots,a_j^3)),\ldots,M(max(a_1^k,a_2^k,a_3^k,\ldots,a_j^k)) \quad (6)$$

Letting X represent the "should cost" for the product design, a list of components within "should cost" ($R_{sc}$) may be defined. A cost of the list $R_{sc}$ may be represented by $V_{sc}$ and the priority of the features $H_k$ may be defined as $q_k$, where k=1, 2, 3, . . . , n, where ascending order represents higher priority. Now, let T be a function that returns the feature given the priority, such that $t(qk)=H_k$ and let submax be a function that returns the second highest values in a set of variables, and let $Y=max(q_k)$, where a first time value of $Y=0$ and then=$max(q_k)$. Finally, let $w=T(max(q_k-\{Y\}))$. Taking the above into account, $R_{sc}$ may be given by:

$$R_{sc}=M(max(a_1^1,a_2^1,a_3^1,\ldots,a_j^1)),M(max(a_1^2,a_2^2,a_3^2,\ldots,a_j^2)),M(max(a_1^3,a_2^3,a_3^3,\ldots,a_j^3)),M(submax(a_1^w,a_2^w,a_3^w,\ldots,a_j^w-\{Z\})),\ldots,M(max(a_1^k,a_2^k,a_3^k,\ldots,a_j^k)), \quad (7)$$

where $Z=submax(a_1^w, a_2^w, a_3^w, \ldots, a_j^w)$. Utilizing Y, first time value of Z=0 and then $submax(a_1^w, a_2^w, a_3^w, \ldots a_j^w)$, $V_{sc}$ may be expressed as:

$$V_{sc} = \sum^n (O(M(max(a_1^1, a_2^1, a_3^1, \ldots, a_j^1)))), \\ \sum^n (O(M(max(a_1^2, a_2^2, a_3^2, \ldots, a_j^2)))), \\ \sum^n (O(M(max(a_1^3, a_2^3, a_3^3, \ldots, a_j^3)))), \\ \sum (O(M(submax(a_1^w, a_2^w, a_3^w, \ldots, a_j^w - \{Z\})))), \\ \ldots, \sum^n (O(M(max(a_1^k, a_2^k, a_3^k, \ldots, a_j^k)))), \quad (8)$$

Equation (7) may keep finding a list of suitable components until Vsc≤X. In this manner, a percentage of the cost difference between actual and "should cost" for each feature may be reduced, which may facilitate creation of an eBOM.

As described above, once the designer completes the design and generates eBOM, it may be received to the rationalization engine along with the costing inputs. A master dataset (e.g., the one or more databases 118 of FIG. 1) may include information regarding all of the components or parts and their corresponding details. As described above, the rationalization engine may be configured to identify duplicate components and suggest lower cost alternative (or substitute) components or parts for the ones listed in the eBOM, we well as suggest near-identical components for the duplicate ones with lower cost and/or near-identical components with lower cost for the non-duplicate ones. To that end, natural language processing (NLP) techniques may be used to determine duplicate components from the master dataset (e.g., based on part name, part description, and the like). As described above, the NLP techniques may include Levenshtein distance algorithms, which may be used to determine the length of nearest correct word, and phonetics algorithms to identify words that sound similar but are spelled differently. A hash map may be used as a data structure for such queries to achieve better and faster search results. The output of the NLP processing may include a number of components identified as duplicates and a percentage of components in the eBOM identified as duplicates.

Now, let $c_1, c_2, c_3, \ldots, c_n$ be the list of duplicate parts identified, where n represents the number of duplicate components. Let $C_{c1}, C_{c2}, C_{c3}, \ldots, C_{cn}$ be the corresponding cost of those duplicate components, as may be determined from the master dataset, and let $I_{c1}, I_{c2}, I_{c3}, \ldots, I_{cn}$ be the corresponding cost of those duplicate components in the eBOM created by the designer. Let $P_d$ be the cost savings that can be achieved due to difference in prices (e.g., differences in prices between the I and C. Letting Tc be the total of the design from the eBOM, the cost savings may be determined according to:

$$P_d(I_{c1}-C_{c1})+(I_{c2}-C_{c2})+(I_{c3}-C_{c3})+\ldots+(I_{cn}-C_{cn}), \quad (9)$$

If $P_d>0$, then the cost savings achieved by identifying duplicate components may be expressed as $P_d/T_c*100\%$.

Several factors in the master dataset may be used to determine near-identical parts. One such factor may be substitute parts having lower cost suggested for duplicate items (e.g., a basis part attribute). To illustrate, let part $attribute_{1-i}$ in the master data set be represented by $a_1, a_2, a_3, \ldots, a_i$, and let part $attribute_{1-j}$ in the eBOM be represented by $b_1, b_2, b_3, \ldots, b_j$, where j≤i. Let $c_1, c_2, c_3, \ldots, c_n$ be the list of duplicate parts identified, where n=number of duplicate parts, and let $d_1, d_2, d_3, \ldots d_m$ be the list of parts in the master dataset, such that m=total number of parts in the master dataset. Let $Z_{dm}$ be the corresponding cost of any part m in the master dataset, such that m=total number of parts in the master dataset. Let $I_{c1}, I_{c2}, I_{c3}, \ldots, I_{cn}$ be the corresponding cost of those duplicate components in the eBOM created by the designer, U be the total cost of the eBOM, and $\pm y_j$ % be the variation allowed to qualify as a substitute part, $\pm y_j$ % may be adjusted or configured by the designer (or another user).

Then, for each duplicate part $c_n$, check across the master dataset, evaluate:

$[(c_1(b_1)*(100-y_1)/100 \leq d_1(a_1) \leq c_1(b_1)*(100+y_1)/100) \| (c_1(b_2)*(100-y_2)/100 \leq d_1(a_2) \leq c_1(b_2)*(100+y_2)/100) \ldots \| \ldots (c_1(b_j*(100-y_j)/100 \leq d_1(a_j) \leq c_1(b_j)*(100+y_j)/100) \&\& Z_{d1} < I_{c1})]$? Suggest $d_1$ as substitute part (10)

The comparison of $c_1$ may be performed with $d_2, d_3, \ldots, d_m$ and so on for all cn, and may produce a list of substitute parts that may be suggested the designer for all the duplicate parts having a lower cost than the cost associated with the eBOM created by the designer.

After all such suggested $d_m$, the reduced cost % as opposed to initial cost in the eBOM may be calculated as:

$$(\Sigma_{n=1,m=1}^{n,m}(I_{cn}-Z_{dm}))/U*100\%, \quad (11)$$

To identify near-identical components with a lower cost suggested for non-duplicate items (e.g., on a part attribute and part dimensions basis), let v1, v2, v3, . . . , vt be the number of dimension types in the master dataset, w1, w2, w3, . . . , wx be the number of dimension types for parts in the eBOM, and g1, g2, g3, . . . , gs be the list of non-duplicate parts in the eBOM, where s+n represents the total number of components in the eBOM. Letting Hg1, Hg2, Hg3, . . . , Hgs be the corresponding cost of non-duplicate components in the eBOM created by the designer and $\pm zx$ % be the variation allowed in the dimensions to qualify as a near-identical part, where $\pm zx$ % may be adjusted or configured by the designer (or another user). Then, for each non-duplicate part gs, the algorithm will check across the master dataset according to:

$[\{(g_1(b1)*(100-y_1)/100 \leq d_1(a_1) \leq g_1(b_1)*(100+y_1)/100) \| (g_1(b_2)*(100-y_2)/100 \leq d_1(a_2) \leq g_1(b_2)*(100+y_2)/100) \ldots \| \ldots (g_1(b_j)*(100-y_j)/100 \leq d_1(a_j) \leq g_1 (b_j)*(100+y_j)/100) \&\& (g_1(w_1)*(100-z_1)/100 \leq d_1 (v_1) \leq g_1(w_1)*(100+z_1)/100) \| (g_1(w_2)*(100-z_2)/100 \leq d_1(v_2) \leq g_1(w_2)*(100+z_2)/100) \| (g_1(w_x)*(100-z_x)/100 \leq d_1(v_x) \leq g_1(w_x)*(100+z_x)/100)\} \&\& (Z_{d1} < H_{g1})]$? Suggest $d_1$ as Near Identical Part (12)

The comparison of $g_1$ may be repeated for $d_2, d_3, \ldots, d_m$ and so on for all $g_s$ to produce a list of near-identical parts that may suggested to the designer for all of the non-duplicate parts, each of which may have a lower cost than corresponding part or component in the eBOM created by the designer.

After all such suggested $d_m$, the reduced cost % as opposed to initial cost in the eBOM may be calculated as:

$$(\Sigma_{s=1,m=1}^{s,m}(H_{gs}-Z_{dm}))/U*100\% \tag{13}$$

This algorithm in combination with another algorithm may also suggest parts or components that are 3D printable and that are non-3D printable based on the material and dimensions of the parts or components. In an aspect, the output may be of the form: 30% 3D printable; 70% non-3D printable. Additionally, for the non-3D printable parts the algorithm may suggest near-identical parts or components (e.g., on a part attribute and part dimensions basis) having a cost that is either less or more than the original cost in the eBOM. To illustrate, let $r_1, r_2, r_3, \ldots, r_q$ be the list of non-3D printable parts in the eBOM, where q=total number of non-3D printable parts. Then, for each non-3D printable part $r_q$, the algorithm may check across the master data set according to:

$$[\{(r_1(b_1)*(100-y_1)/100<=d_1(a_1)<=r_1(b_1)*(100+y_1)/100)\|(r_1(b_2)*(100-y_2)/100<=d_1(a_2)<=r_1(b_2)*(100+y_2)/100)\ldots\|\ldots(r_1(b_j)*(100y_1)/100<=d_1(a_j)<=r_1(b_j)*(100+y_j)/100)\} \&\& \{(r_1(w_1)*(100-z_1)/100<=d_1(v_1)<=r_1(w_1)*(100+z_1)/100)\|(r_1(w_2)*(100-z_2)/100<=d_1(v_2)<=r_1(w_2)*(100+z_2)/100)\|(r_1(w_x)*(100-z_x)/100<=d_1(v_x)<=r_1(w_x)*(100+z_x)/100)\}]$$ ? Suggest $d_1$ as Near Identical Part The comparison of $r_1$ may be repeated with $d_2, d_3, \ldots, d_m$ and so on for all $r_q$ to produce a list of near-identical parts that may be suggested to the designer for all the non-3D printable parts which may have cost higher or lower than the original cost in the eBOM.

As shown above and referring back to FIG. 1, a user (e.g., a designer) may utilize the designer device 130 to design a product to be manufactured. As part of the design process, features and capabilities of the product may be defined and prioritized. The features and capabilities specified by the designer may be provided to the computing device 110 and more specifically, to the recommendation engine 120. As described above with reference to FIG. 2, the recommendation engine 120 may evaluate the features and capabilities using machine learning logic (e.g., the machine learning engine 214 of FIG. 2) to identify a set of components that are correlated to the specified features or capabilities. Moreover, a cost analyzer (e.g., the cost analyzer 220 of FIG. 2) of the recommendation engine 120 to optimize the product design with respect to cost on a component and feature basis. The outputs of the recommendation engine 120 may then be provided to the designer device 130 and used to establish an eBOM for the product being designed.

Once the eBOM is created, it may be provided as an input to the rationalization engine 122. As described above with reference to FIG. 3, the rationalization engine 122 may be configured to identify duplicate parts, non-duplicate parts, substitute parts, near-identical parts, 3D printable and non-3D printable parts, and the like. The operations of the rationalization engine 122 may enable product design processes to take into account "should cost," which is difficult to perform using presently available technologies. The "should cost" approach utilized by the rationalization engine 122 may enable a proposed product design (e.g., a product design specified in the initial eBOM) to be optimized across a variety of factors based on the duplicate parts, non-duplicate parts, substitute parts, near-identical parts, and 3D printable parts and at a reduced production cost. It is noted that in addition to optimizing the eBOM, operations of the recommendation engine 120 and the rationalization engine 122 may also increase the speed at which products may be designed. To illustrate, by leveraging machine learning logic to identify parts and components applicable to features and capabilities of the product being designed, the recommendation engine 120 may enable the designer to more rapidly perform part or component selection, which may enable an eBOM of parts or components correlated to the features or capabilities of the designed product to be created more quickly. Moreover, the operations of the rationalization engine 122 may be utilized to identify alternative products or components (i.e., alternatives to the initial eBOM) that, while reducing the cost of the product, also satisfy the feature and capability requirements for the product and that are within the permitted attribute and dimension variances.

Upon finalizing the eBOM, the product may be manufactured. For example, the eBOM and other information (e.g., work flows, part or component logistics and sourcing, etc.) may be created for assembling or producing the product. The eBOM and other information may be used to configure manufacturing infrastructure 160 and once configured, the manufacturing infrastructure 160 may be used to produce the newly designed product. For example, configuring the manufacturing infrastructure may include configuring a 3D printer to print one or more components for a designed product based on the identified 3D printable parts or components. In some aspects, a 3D printing file may be generated based on a CAD drawing or other specifications for a particular component or part. As another non-limiting example, machine-based manufacturing tools (e.g., robotic arms, drivers, etc.) may be calibrated based on the dimensions of one or more selected components. To illustrate, where a first component is to be secured to a second component using a fastener (e.g., a pin, a rod, a screw, etc.), robotic assembly tools may be calibrated to bring the first and second components into alignment so that a robotic driver can then insert and secure the components together using the fastener. The calibration of the robotic assembly tools may be determined, at least in part, on dimensions of the components or other information associated with the final eBOM. It is noted that the exemplary operations described above have been provided for purposes of illustration, rather than by way of limitation and that other types of manufacturing infrastructure configuration operations may be utilized in conjunction with the concepts disclosed herein.

Figure 4:
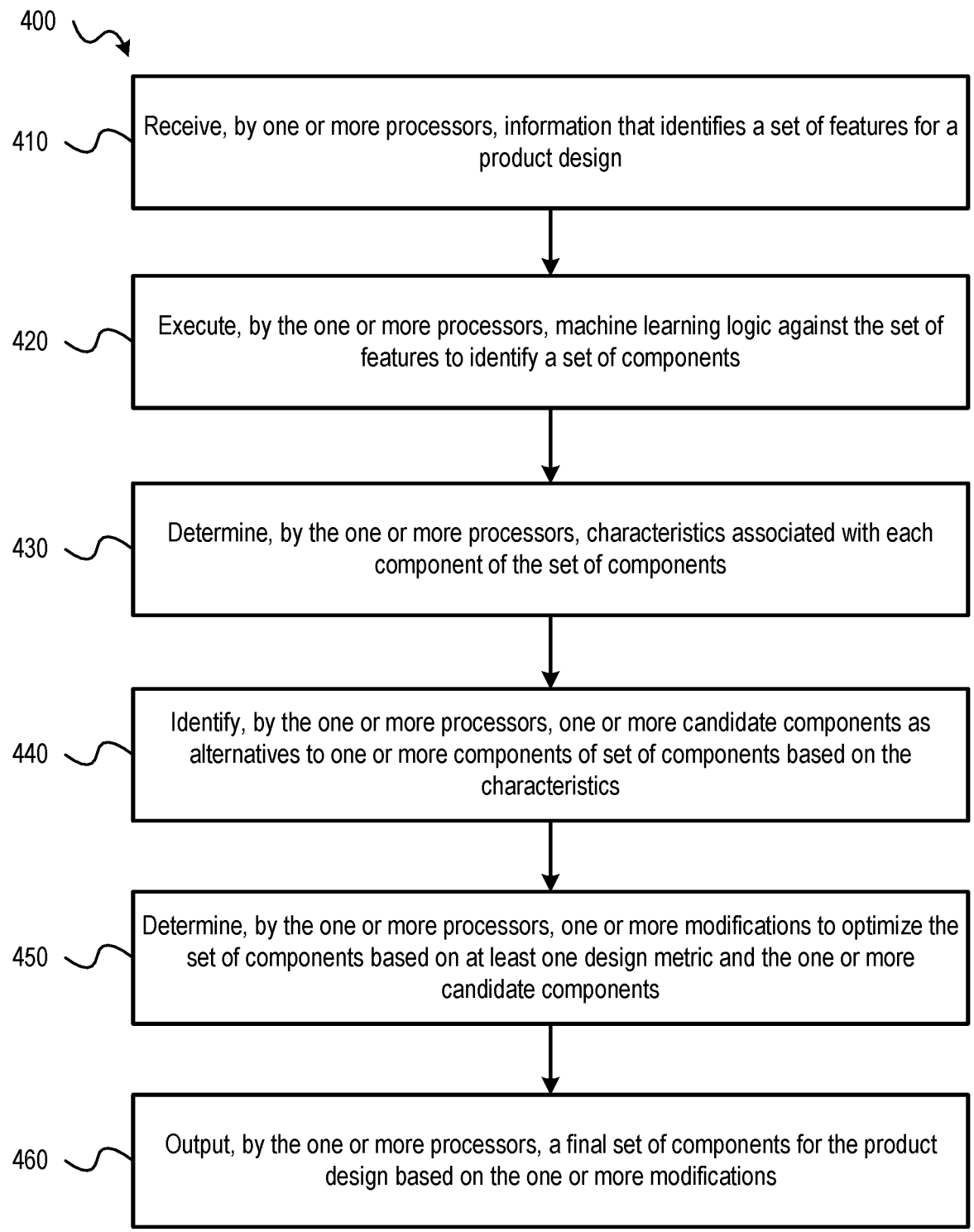
FIG. 4 is a flow diagram illustrating an example of a method for design processes in accordance with the present disclosure.

Referring to FIG. 4, a flow diagram of an example of a method for optimizing a product design according to one or more aspects of the present disclosure is shown as a method 400. In some implementations, the operations of the method 400 may be stored as instructions (e.g., the instructions 116 or the instructions 136 of FIG. 1) that, when executed by one or more processors (e.g., the one or more processors of a computing device or a server, such as the one or more processors 112 or the one or more processors 132 of FIG. 1), cause the one or more processors to perform the operations of the method 400. In some implementations, the method 400 may be performed by a computing device, such as the computing device 110 of FIG. 1 or the designer device 130 of FIG. 1. Certain aspects of the method 400 may involve operations of a recommendation engine, such as the recommendation engine 120 of FIG. 1 and/or the recommendation engine 200 of FIG. 2, and a rationalization engine, such as the rationalization engine 122 of FIG. 1 and/or the rationalization engine 300 of FIG. 3. Additional or alternative aspects of the method 400 may involve operations of a cloud-based system, such as the design optimizer 152 of FIG. 1.

At step 410, the method 400 includes receiving, by one or more processors, information that identifies a set of features for a product design. As described above, the set of features may include information associated with features and capabilities of the product being designed. The set of features may be created based on inputs from a variety of sources, such as the customer for which the product is being designed, inputs based on market research (e.g., which features are of interest to consumers or industry, etc.), inputs from a designer, or other sources. At step 420, the method 400 includes executing, by the one or more processors, machine learning logic against the set of features to identify a set of components. In an aspect, the machine learning logic may be the machine learning engine 214 of FIG. 2. As described above, the set of components identified by the machine learning logic may include components corresponding to each feature of the set of features. In some aspects, identification of the components may also involve operations of a cost analyzer, as described above with reference to FIG. 2. Additionally, the set of components may be based on inputs received from a designer (e.g., via the designer device 130 of FIG. 1).

At step 430, the method 400 include determining, by the one or more processors, characteristics associated with each component of the set of components. In some aspects, the characteristics may be determined using rationalization engine, such as the rationalization engine 122 of FIG. 1 or the rationalization engine 300 of FIG. 3. As described above, the characteristics may be compared using natural language processing techniques, such as Levenshtein algorithms, phonetics algorithms, and the like, based on information extracted from an eBOM. At step 440, the method includes identifying, by the one or more processors, one or more candidate components as alternatives to one or more components of the set of components based on the characteristics. As described above, the candidate components may be selected based on identification of duplicate components, near-identical components, and 3D printable components.

At step 450, the method 400 includes determining, by the one or more processors, one or more modifications to optimize the set of components based on at least one design metric and the one or more candidate components. As explained above with reference to FIG. 3, at least one design metric may include an attribute variance metric, a dimensions variance metric, a cost metric, a weight metric, or a combination thereof. The at least one design metric may be used to evaluate whether the candidate components are suitable as replacements or substitutes for components identified in the set of components determined in step 420. It is noted that the various design metrics may each evaluate a candidate component based on different criteria. To illustrate, the dimensions variance metric may evaluate the dimensions of the candidate component to determine whether the candidate component's dimensions are within an allowed variance level (or tolerance level) while the cost metric may determine whether a cost of the candidate component is higher or lower than a component of the set of components.

At step 460, the method 400 includes outputting, by the one or more processors, a final set of components for the product design based on the one or more modifications. The final set of components may include at least one candidate component selected from the one or more candidate components evaluated at step 450, and the at least one candidate component may optimize the final set of components as compared to the set of components with respect to the at least one design metric. For example, the final set of components that includes the at least one candidate component may be optimized with respect to the cost metric such that producing the product using the final set of components is cheaper than using the set of components. As another example, the final set of components that includes the at least one candidate component may be optimized with respect to the weight metric such that producing the product using the final set of components results in a product that is lighter than the product would be using the set of components.

In some aspects, the above-described techniques may be utilized in the context of product design. For example, the method 400 and other concepts described and illustrated with reference to FIGS. 1-4 may be utilized to provide product design methodology that streamline and speed up the product design process. Moreover, the ability to provide automated or semi-automated product design methodology may enable products to optimize across a variety of design metrics, resulting in products that are more efficient (e.g., weigh less) or are more efficiently produced (e.g., produced at a reduced cost, produced with components that are more suitable to the features of the product, and the like). Additionally, the design methodologies and capabilities provided by the present disclosure leverage feedback loops and machine learning to identify designer biases and preferences and take those biases and preferences into account to more efficiently and rapidly perform component selection. It is noted that these are just some of the advantages provided by embodiments of the present disclosure and that other improvements and advantages may be readily recognized by persons of skill in the art.

It is noted that other types of devices and functionality may be provided according to aspects of the present disclosure and discussion of specific devices and functionality herein have been provided for purposes of illustration, rather than by way of limitation. It is noted that the operations of the method 400 of FIG. 4 may be performed in any order, or that operations of one method may be performed during performance of another method. It is also noted that the method 400 of FIG. 4 may also include other functionality or operations consistent with the description of the operations of the system 100 of FIG. 1, the recommendation engine 200 of FIG. 2, or the rationalization engine 300 of FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-4) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for machine learning based product design, the method comprising:
  receiving, by one or more processors, information that identifies a set of features for a product design;
  executing, by the one or more processors, machine learning logic against the set of features to identify a set of components, wherein the set of components comprises components corresponding to each feature of the set of features, wherein the machine learning logic is configured to output correlation coefficients representative of a correlation between the set of components and the set of features;
  determining, by the one or more processors, characteristics associated with each component of the set of components based on the correlation coefficients;
  identifying, by the one or more processors, one or more candidate components as alternatives to one or more components of set of components based on the characteristics;
  determining, by the one or more processors, one or more modifications to optimize the set of components based on at least one design metric and the one or more candidate components, wherein the at least one design metric comprises an attribute variance metric and a cost metric;
  outputting, by the one or more processors, a final set of components for the product design based on the one or more modifications, wherein the final set of components includes at least one candidate component selected from the one or more candidate components, and wherein the at least one candidate component optimizes the final set of components with respect to the at least one design metric;
  identifying, by a rationalization engine, at least one 3D printable component from the final set of components for the product design based on the machine learning logic;
  determining, by the rationalization engine, whether the identified at least one 3D printable component is within an attribute variance of the product design;
  providing 3D printable component data to the attribute variance metric if the at least one 3D printable component is inside the attribute variance;
  selecting, by the rationalization engine, a next 3D printable component if the at least one 3D printable component is outside the attribute variance;
  providing an updated 3D printable component data associated with the next 3D printable component to the attribute variance metric; and
  producing, by a 3D printing module, the at least one 3D printable component of a newly designed product based on attribute variance metric and the cost metric.

2. The method of claim 1, wherein identifying the one or more candidate components comprises identifying duplicate components of the product design.

3. The method of claim 1, wherein identifying the one or more candidate components comprises identifying non-duplicate components of the product design.

4. The method of claim 1, wherein the at least one design metric further comprises, a dimensions variance metric, a weight metric, or a combination thereof.

5. The method of claim 1, wherein identifying one or more candidate components as alternatives to one or more components of the set of components based on the characteristics is performed iteratively based on the set of features.

6. The method of claim 5, further comprising identifying a first candidate component as an alternative to a second candidate component during at least one iteration of the identifying, the second candidate component selected as an alternative to a component of the set of components during a previous iteration of the identifying.

7. A system for machine learning based product design, the system comprising:
a memory; and
one or more processors communicatively coupled to the memory, the one or more processors configured to:
receive information that identifies a set of features for a product design;
execute machine learning logic against the set of features to identify a set of components, wherein the set of components comprises components corresponding to each feature of the set of features, wherein the machine learning logic is configured to output correlation coefficients representative of a correlation between the set of components and the set of features;
determine characteristics associated with each component of the set of components based on the correlation coefficients;
identify one or more candidate components as alternatives to one or more components of set of components based on the characteristics;
determine one or more modifications to optimize the set of components based on at least one design metric and the one or more candidate components, wherein the at least one design metric comprises an attribute variance metric and a cost metric;
output a final set of components for the product design based on the one or more modifications, wherein the final set of components includes at least one candidate component selected from the one or more candidate components, and wherein the at least one candidate component optimizes the final set of components with respect to the at least one design metric;
identify, by a rationalization engine, at least one 3D printable component from the final set of components for the product design based on the machine learning logic;
determine, by the rationalization engine, whether the at least one 3D printable component is within an attribute variance of the product design;
provide 3D printable component data to the attribute variance metric if the at least one 3D printable component is inside the attribute variance metric;
select, by the rationalization engine, a next 3D printable component if the at least one 3D printable component is outside the attribute variance;
provide an updated 3D printable component data associated with the next 3D printable component to the attribute variance metric; and
produce, by a 3D printing module, the at least one 3D printable component of a newly designed product based on the attribute variance metric and the cost metric.

8. The system of claim 7, wherein the machine learning logic is configured to output correlation coefficients representative of a correlation between each component and the set of features, and wherein the one or more processors are configured to:
receive feedback based on component selections by a designer; and
update the correlation coefficients output by the machine learning logic based on the feedback.

9. The system of claim 7, wherein identification of the one or more candidate components comprises identifying duplicate components of the product design.

10. The system of claim 7, wherein identification of the one or more candidate components comprises identifying non-duplicate components of the product design.

11. The system of claim 7, wherein the at least one design metric further comprises a dimensions variance metric, a weight metric, or a combination thereof.

12. The system of claim 7, wherein the one or more processors are configured to: iteratively identify the one or more candidate components as alternatives to one or more components of set of components based on the characteristics, wherein each iteration is associated with a different characteristic of the characteristics; and
identify a first candidate component as an alternative to a second candidate component during at least one iteration of the identifying, the second candidate component selected as an alternative to a component of the set of components during a previous iteration of the identifying.

13. A non-transitory computer-readable storage medium storing instructions that, when executed by one or more processors, cause the one or more processors to perform operations comprising:
receiving information that identifies a set of features for a product design;
executing machine learning logic against the set of features to identify a set of components, wherein the set of components comprises components corresponding to each feature of the set of features, wherein the machine learning logic is configured to output correlation coefficients representative of a correlation between the set of components and the set of features;
determining characteristics associated with each component of the set of components based on the correlation coefficients;
identifying one or more candidate components as alternatives to one or more components of set of components based on the characteristics;
determining one or more modifications to optimize the set of components based on at least one design metric and the one or more candidate components, wherein the at least one design metric comprises an attribute variance metric and a cost metric;
outputting a final set of components for the product design based on the one or more modifications, wherein the final set of components includes at least one candidate component selected from the one or more candidate components, and wherein the at least one candidate component optimizes the final set of components with respect to the at least one design metric
identifying at least one 3D printable component from the final set of components for the product design based on the machine learning logic;
determining whether the at least one 3D printable component is within an attribute variance of the product design;
providing 3D printable component data to the attribute variance metric if the at least one 3D printable component is inside the attribute variance metric;
selecting a next 3D printable component if the at least one 3D printable component is outside the attribute variance;
providing an updated 3D printable component data associated with the next 3D printable component to the attribute variance metric; and
producing the at least one 3D printable component of a newly designed product based on the attribute variance metric and the cost metric.

14. The non-transitory computer-readable storage medium of claim 13, the operations further comprising:
   modifying at least one correlation coefficient output by the machine learning logic; and
   training, the machine learning based at least in part on at least one modified correlation coefficient.

15. The non-transitory computer-readable storage medium of claim 13, the operations further comprising configuring manufacturing infrastructure based on the final set of components, wherein the designed product is produced, at least in part, by the manufacturing infrastructure based on the configuring.

16. The non-transitory computer-readable storage medium of claim 13, wherein identifying one or more candidate components as alternatives to one or more components the of set of components based on the characteristics is performed iteratively based on the set of features, the operations comprising:
   identifying a first candidate component as an alternative to a second candidate component during at least one iteration of the identifying, the second candidate component selected as an alternative to a component of the set of components during a previous iteration of the identifying.

* * * * *